United States Patent [19]
Ikeda

[11] Patent Number: 6,014,591
[45] Date of Patent: Jan. 11, 2000

[54] APPARATUS AND METHOD OF GENERATING CONTROL PROGRAM

[75] Inventor: Nobuyuki Ikeda, Kawasaki, Japan

[73] Assignee: Kabushiki Kaisha Toshiba, Kawasaki, Japan

[21] Appl. No.: 08/922,461

[22] Filed: Sep. 3, 1997

[30] Foreign Application Priority Data

Sep. 3, 1996 [JP] Japan ................................. 8-233449

[51] Int. Cl.⁷ .................... G05C 19/00; G05C 13/00; B43K 29/08
[52] U.S. Cl. ................... 700/1; 700/5; 700/12; 395/475
[58] Field of Search ................... 364/130, 134, 364/141, 140; 395/475

[56] References Cited

U.S. PATENT DOCUMENTS

| | | | |
|---|---|---|---|
| 3,810,118 | 5/1974 | Kiffmeyer | 364/130 |
| 4,034,354 | 7/1977 | Simmons | 364/136 |
| 4,215,398 | 7/1980 | Burkett et al. | 364/136 |
| 4,628,435 | 12/1986 | Tashiro et al. | 364/130 |
| 4,763,055 | 8/1988 | Daggett et al. | 318/568.14 |
| 4,853,874 | 8/1989 | Iwamaot et al. | 395/84 |
| 4,864,204 | 9/1989 | Daggett et al. | 318/568.2 |
| 4,893,480 | 1/1990 | Matsui et al. | 62/225 |
| 5,128,857 | 7/1992 | Okada et al. | 364/140.04 |
| 5,321,744 | 6/1994 | Schwagmann | 395/182.07 |
| 5,388,062 | 2/1995 | Knutson . | |

FOREIGN PATENT DOCUMENTS 6-332724 12/1994 Japan .
6-334481 12/1994 Japan .

Primary Examiner—William Grant
Assistant Examiner—Iván Calcano
Attorney, Agent, or Firm—Banner & Witcoff, Ltd.

[57] ABSTRACT

A control program generating apparatus for generating a control program, comprises means for storing a plurality of control filter components corresponding to a plurality of partial specifications, respectively; priority designation means for designating the priority of each of the partial specifications, and generating means for combining the control filter components corresponding to a plurality of the partial specifications on the basis of the priority designated by the priority designation means.

25 Claims, 17 Drawing Sheets

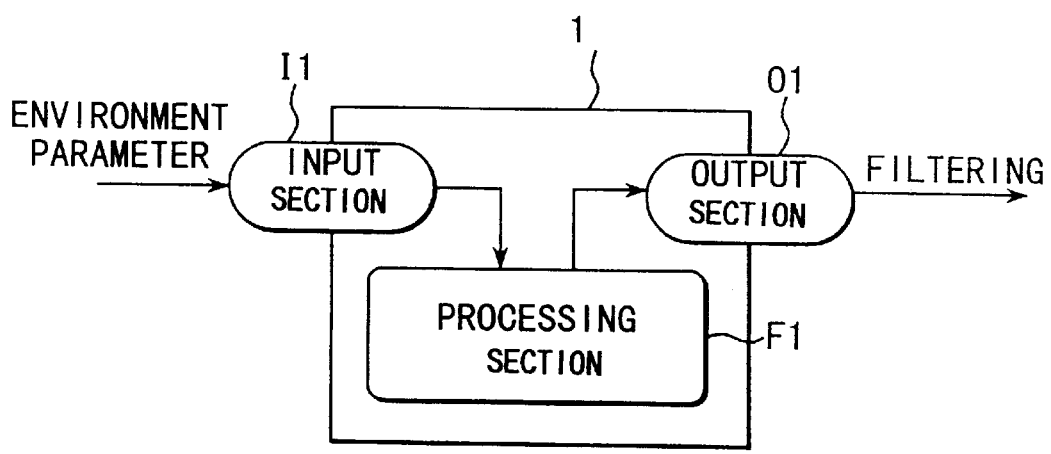
F I G. 4

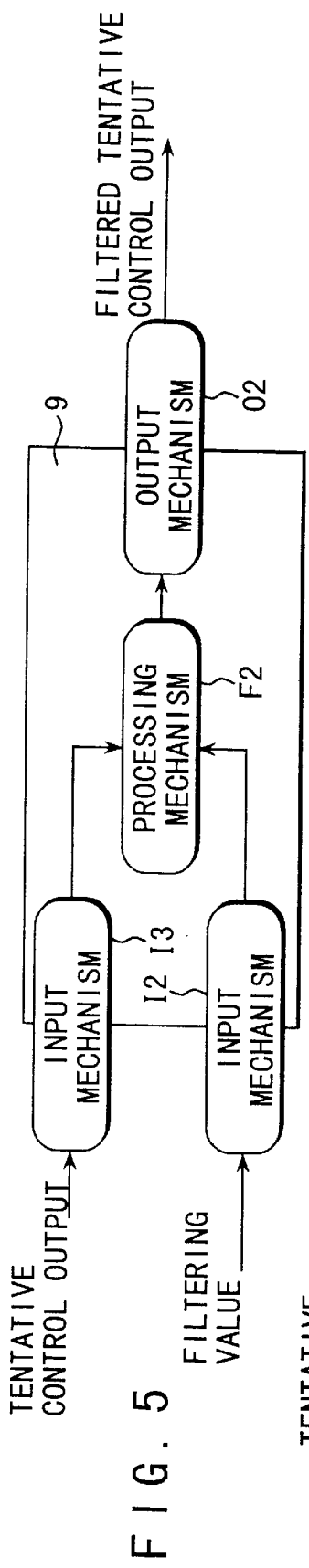
F I G. 5
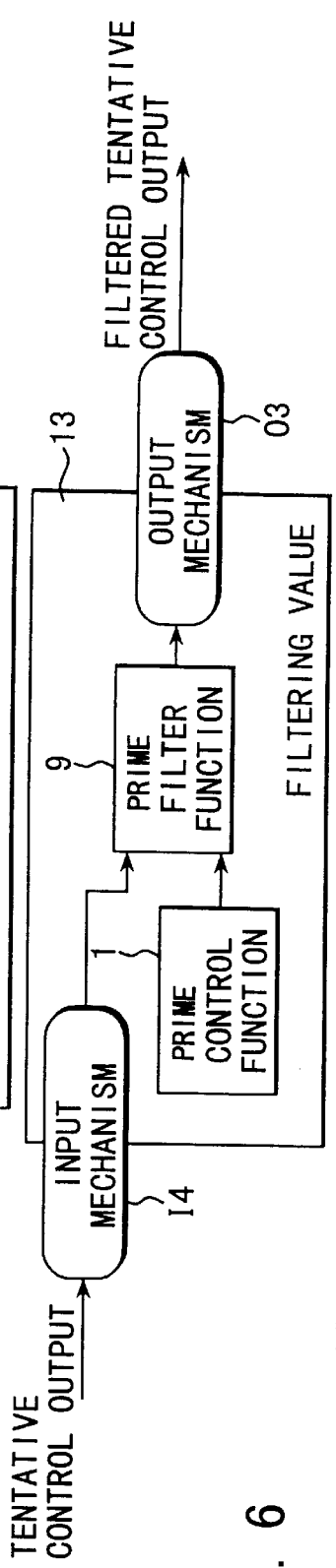
F I G. 6
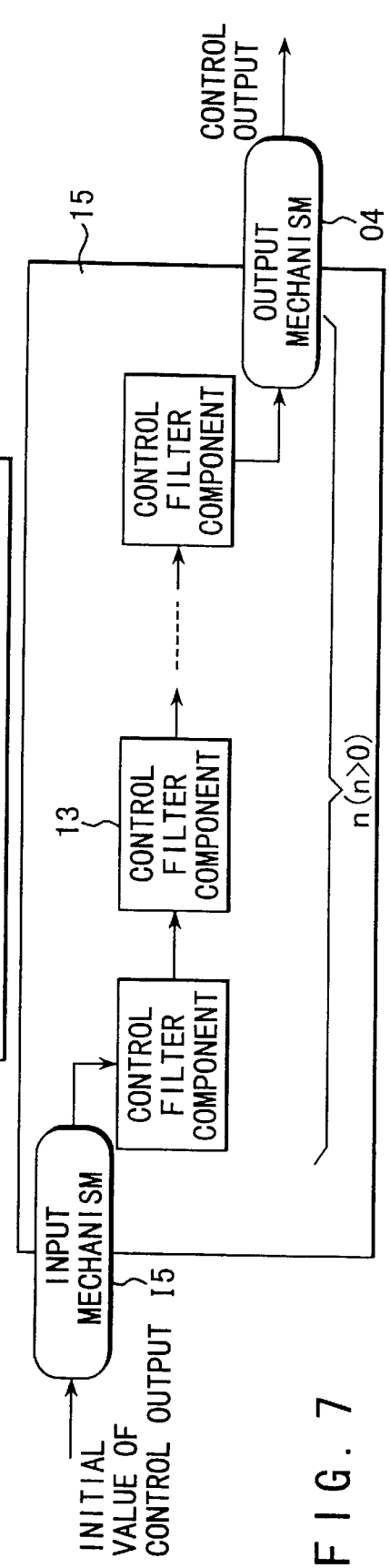
F I G. 7

FIG. 8B

FILTER SPECIFICATION : FAN TEMPERATURE CONTROL

| SET TEMPERATURE - ROOM TEMPERATURE | LESS THAN 0.5° | 0.5° OR MORE AND LESS THAN 1.0° | 1.0° OR MORE |
|---|---|---|---|
| ROTATION FREQUENCY | MAINTAIN PREVIOUS OUTPUT | 20Hz | 50Hz |

PRIME CONTROL FUNCTION : f

```
int f() {
    int ts, ta;

ts = getTs();
    ta = getTa();

if (ts - ta < 5) {
        return prevpipe0;
    } else if (ts - ta < 20) {
        return 20;
    } else {
        return 50;
    };
}
```

REGISTER ○—103R

103

```
int f0(){
    int ts, ta;            /* ts IS SET TEMPERATURE, ta IS ROOM TEMPERATURE */
    ts = getTs();          /* getTs(),getTa ARE DEVICE DRIVER FOR INPUT DEVICE */
    ta = getTa();
    if (ts - ta < 5) {     /* CALCULATING OUTPUT VALUE */
        return prevPipe0;  /* prevPipe0 IS
                              STORING FEEDBACK DATA (GLOBAL VARIABLE) */
    } else if (ts - ta < 20) {
        return 20;
    } else {
        return 50;
    }
};
```

FIG. 10

```
maxFilter(int input, int param){
    if (input > param) input = param;
    return input;
}
```

FIG. 11

```
minFilter(int input, int param){
    if (input < param) input = param;
    return input;
}
```

FIG. 12

```
uniqueFilter(int input, int param){
    return param;
}
```

FIG. 13

CONTROL PIPE COMPONENT

```
int pipe0(int input) {
    input = filterControl1(input);
    input = filterControl2(input);
    return input;
}
```

CONTROL PROGRAM

```
int prevPipe1,prevPipe2; /*STORING FEEDBACK DATA*/ void controlProgram(){
    int prevPipe1 = INITIAL VALUE1;  /*INITIALIZE STORED FEEDBACK DATA*/
    int prevPipe2 = INITIAL VALUE2;

START MEASURING TIME;
    for(;;){
        if (LAPSE OF 10 SECONDS) {
            START MEASURING TIME;
            prevPipe1 = pipe1(prevPipe1);  /*UPDATE STORED FEEDBACK DATA*/
            prevPipe2 = pipe2(prevPipe2);
        }
        /*LOAD DEVICE DRIVER FOR OUTPUT DEVICE*/
        setOutput0(pipe0(10));  /*ARGUMENT 10 OF FUNCTION pipe0 IS FIXED INITIAL VALUE*/
        setOutput1(prevPipe1);
        setOutput2(prevPipe2);
    }
}
```

F I G . 2 0

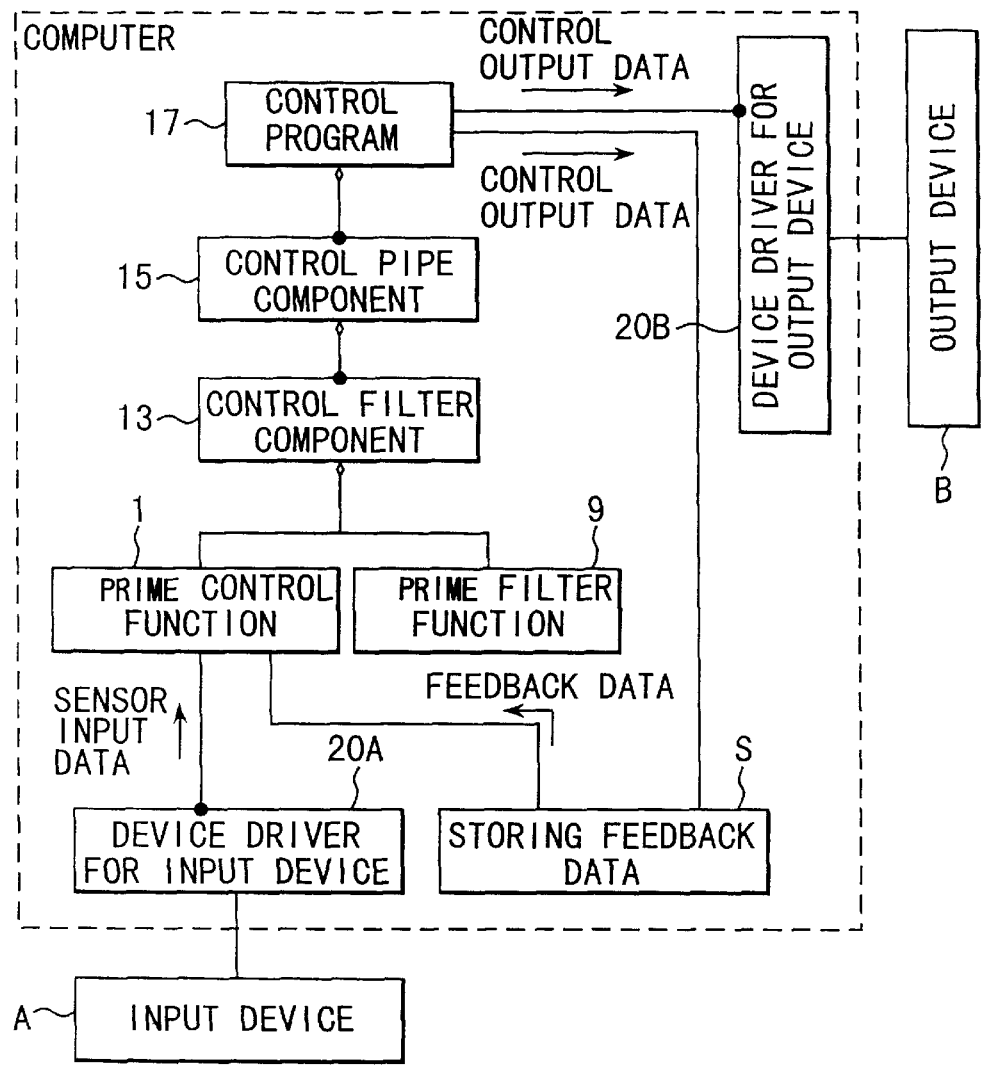
MEANING OF NOTATION
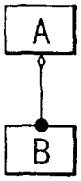
WHOLE-PARTIAL RELATIONSHIP OF 1 TO MAJORITY: A IS COMPOSED OF PLURAL B
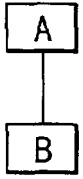
1 TO 1 RELATIONSHIP: DATA IS TRANSMITTED /RECEIVED BETWEEN A AND Bs
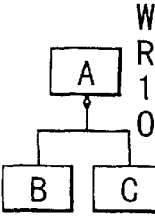
WHOLE-PARTIAL RELATIONSHIP OF 1 TO 2: A IS COMPOSED OF B AND C
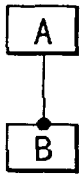
1 TO MAJORITY RELATIONSHIP: DATA IS TRANSMITTED/RECEIVED BETWEEN A AND PLURAL Bs
FIG. 21

```
int prevPipe0,prevPipe1,prevPipe2;/*STORING FEEDBACK DATA*/ void controlProgram(){
  int prevPipe0 = INITIAL VALUE0;  /*INITIALIZE STORED FEEDBACK DATA*/
  int prevPipe1 = INITIAL VALUE1;
  int prevPipe2 = INITIAL VALUE2;

START MEASURING TIME;
  for(;;){
    if (LAPSE OF 10 SECONDS) {
      START MEASURING TIME;
      prevPipe0 = pipe0(prevPipe0);  /*UPDATE STORED FEEDBACK DATA*/
      prevPipe1 = pipe1(prevPipe1);
      prevPipe2 = pipe2(privPipe2);
      setOutput0(prevPipe0);  /*LOAD DEVICE DRIVER FOR OUTPUT DEVICE*/
      setOutput1(prevPipe1);
      setOutput2(prevPipe2);
    }
  }
}
```

F I G. 22

APPARATUS AND METHOD OF GENERATING CONTROL PROGRAM

BACKGROUND OF THE INVENTION

The present invention relates to an apparatus and a method for generating a control program efficiently based on a plurality of partial programs.

Conventionally, a computer program for controlling various systems including an air-conditioning system (i.e., a control program) is known. The control program is executed for each device as a unit of control. An example device is a compressor, a fan or a louver included in an air-conditioning system. The control specification for a given device includes a plurality of partial specifications generated from different viewpoints, and a conflict exists between the partial specifications due to the difference in viewpoint.

In generating a control program, these conflicts are conventionally eliminated in the manner described below. Specifically, different partial specifications are generated for different viewpoints separately from each other, and the priority is determined among the partial specifications. In order to obviate the conflict between the partial specifications, the partial specifications are selected in the descending order of priority, and are integrally combined to generate a synthesized overall specification. On the basis of the integrated synthesized specification, a control program is generated. This work is performed manually by the operator.

A control specification for the compressor of the cooler, for example, is generated as follows:

(1) From the viewpoint of controllability (for achieving the shortest time until reaching a target temperature), a partial specification requiring the following output is generated.

TABLE 1

| Input (preset temperature-room temperature) | Less than 0.5° | 0.5° or more but less than 1.0° | 1.0° or more |
|---|---|---|---|
| Output value (revolution frequency) | Hold previous output | 20 Hz | 50 Hz |

(2) From the viewpoint of economy (elimination of wasteful running cost), a partial specification requiring an upper limit described below is generated.

TABLE 2

| Input value (regenerator temperature) | Less than 2.0° | 2.0° or more |
|---|---|---|
| Output value (revolution temperature) | 10 Hz or less | 50 Hz or less |

(3) From the viewpoint of durability (prevention of consumption of each component member of the cooler), a partial specification is generated requiring the output as described below.

TABLE 3

| Input value (outside air temperature) | Less than 10.0° | 10.0° or more |
|---|---|---|
| Output value (revolution frequency) | 30 Hz or more | 0 Hz or more |

The conventional technique for integrating these partial specifications may use the following-described four guides.

[Guide 1]

The condition of an environment parameter affecting the calculation of an output value is called an input condition. In the case where no conflict occurs between partial specifications for a given input, one output value satisfying all the partial specifications at the same time is selected and is used as an output associated with the particular condition.

[Guide 2]

In the case where a conflict occurs between partial specifications under a given input condition, a group of a maximum number of partial specifications is generated, each of which has an output value satisfying all the partial specifications selected in the descending order of priority. An output value satisfying all the partial specifications in the particular group at the same time is determined as an output associated with the particular condition.

[Guide 3]

In the case where there are a plurality of output values satisfying a group of non-conflicting partial specifications in Guide 2, that partial specification in conflict with the group of partial specifications which has the highest order of priority is selected. That output value satisfying the group of partial specifications which is most proximate to the output range due to the conflicting partial specification selected above is determined as an output.

Actually, however, in order to conduct the works of Guides 1 to 3 above efficiently, a specification is configured based on Guide 4 described below.

[Guide 4]

Each partial specification defines a different output value according to the range of the input value (input condition). Prior to application of each guide, therefore, possible combinations of input ranges are divided into different cases in a manner not to double one on another. In this dividing operation, each element making up an input condition is classified for different output values due to a partial specification, and all the combinations of the elements thus divided are generated. An appropriate one of the guides is applied to each case thus divided.

Explanation will be made about an example in which these four guides are applied to a combination of the partial specifications of the above-mentioned Tables 1 to 3 for the compressor. Assume that durability, economy and controllability of the compressor are lower in priority in that order in the partial specifications in Tables 1 to 3. First, the input conditions are classified as indicated in Guide 4. In this example, the input conditions for each partial specification are numerical values variable independently of each other. The partial specifications are thus divided into 3×2×2(=12) combinations. Among the combinations of the input conditions thus divided, explanation will be made about a case in which there occurs no conflict between the partial specifications and a case in which there occurs a conflict between the partial specifications.

As an example with no conflict between partial specifications, consider a situation where the following three conditions are met.

0.5°≦(preset temperature—room temperature)<1.0°

Regenerator temperature≧2.0°

Outside air temperature≧10.0°

The range of the output value (revolution frequency) is determined as 20 Hz based on the partial specifications relating to the controllability, 50 Hz or less based on the partial specifications relating to economy, and 0 Hz or more based on the partial specifications relating to durability. FIG. 1 shows a numeric line representing the relation between these output values. In this case, there occurs no conflict between partial specifications. The output value 20 Hz satisfying the three partial specifications at the same time is selected as an output value associated with an integrated synthesized specification.

On the other hand, consider a situation where the following three conditions are met as an example with a conflict between partial specifications.

1.0°≦(preset temperature - room temperature)
Regenerator temperature<2.0°
Outside air temperature<10.0°

The range of the output value (revolution frequency) is given as 50 Hz based on the partial specification relating to controllability, 10 Hz or less based on the partial specification relating to economy, and 30 Hz or more based on the partial specification relating to durability. FIG. 2 shows a numeric line representing the relation between these output values.

In the case where there partial specifications are conflict with each other in this way, it is impossible to select an output value satisfying all the partial specifications. When Guide 2 is applied, the partial specification relating to durability of top priority and the group of partial specifications not in conflict with the partial specification of top priority is the one for durability. The output value of 30 Hz can thus be selected.

When Guide 3 is applied, the partial specification of top priority which is in conflict with the partial specification relating to durability and highest in priority is the one relating to economy. The output value satisfying this partial specification is 10 Hz or less. The output value of 30 Hz or more based on Guide 2, which is most proximate to "10 Hz or less", is selected as an output value for the overall synthesized specification.

In the conventional method of generating a control program, an overall specification is generated by the operator after checking all the combinations of the input conditions.

In this conventional method, however, the work of eliminating the conflicts between partial specifications and determining an overall specification is required to be performed manually taking the general situation into consideration. The result is that (1) So many steps of manual work are involved that automation is difficult and an error is liable to occur frequently.

(2) With an increase in the number of partial specifications and the types of output value for the partial specifications, the number of cases divided increases to such an extent as to pose the problem that a vast amount of input and output jobs is involved.

(3) Since the contents of cases divided are different for different combinations of partial specifications, the division into components and the reuse of a control program are difficult.

(4) In the case where the contents of the partial specifications or the order of priority between partial specifications is changed, many combinations of the input conditions divided into cases are affected, and therefore a vast amount of the labor required for integrating partial specifications virtually constitutes the resumption of the whole work.

(5) The work of implementing the integrated synthesized specification as a program is carried out for each combination of input conditions. This requires so much manual labor that a change in the contents of the partial specifications or in the order of priority among the partial specifications results in a large-scale repair of the programming work.

BRIEF SUMMARY OF THE INVENTION

An object of the present invention is to provide an apparatus and a method of generating a control program as mentioned below.

(1) A control program for controlling a system is generated efficiently based on a plurality of partial programs to be included in the control program.

(2) The priority of each partial specification is determined over the whole control program using a simple technique.

(3) A complicated control program can be gener- ated easily.

(4) Each data used for generating a control program can be divided into components and reused.

(5) The work contents can be easily checked for coincidence with each partial specification in each stage of generating a control program.

(6) The efficiency of generating a control program is improved in an application to a complicated control program dynamically changing in priority.

In order to achieve the above-mentioned object, the present invention has a configuration and a function as described below.

According to first aspect of the present invention, there is provided an apparatus for generating a control program characterized by comprising means for storing a plurality of control filter components corresponding to a plurality of partial specifications, respectively; priority designation means for designating the priority of each of the partial specifications; and generating means for combining the control filter components corresponding to a plurality of the partial specifications on the basis of the priority designated by the priority designation means. According to a first aspect of the present invention, there is provided an apparatus for generating another control program characterized by comprising means for storing a plurality of control filter components; priority designation means for designating the priority of each of the plurality of control filter components; and generating means for combining the plurality of control filter components on the basis of the priority designated by the priority designation means.

There is also provided a method of generating a control program corresponding to the above-mentioned control program generating apparatus, characterized by comprising the steps of preparing a plurality of control filter components corresponding to a plurality of partial specifications, respectively; designating the priority of each of the partial specifications; and combining the control filter components corresponding to the partial specifications, respectively, on the basis of the priority designated in the priority designation step.

The recording medium for recording a readable code for generating a control program, wherein the code comprises: a code for executing a priority designation process for designating the priority of each of a plurality of the partial specifications using the control filter components corresponding to a plurality of the partial specifications, respectively; and a code for executing the process of generating by combining a control filter component corresponding to each of a plurality of the partial specifications on the basis of the priority designated by the priority designation process, is for recording a control program for realizing the above-mentioned control program generating method.

In the first aspect of the present invention, the partial programs (control filter components) for realizing the contents of individual partial specifications generated from different viewpoints and the partial specifications corresponding to the partial programs are arranged in the order of priority. Then, the partial programs are combined in such a manner as to realize such an order of priority thereby to generate a control program.

As a result, even in the case where there exists a conflict between partial specifications, the order of priority is realized by executing the partial programs in the control program. The work of integrating the partial specifications before generating the control program thus is eliminated. The development of a control program is remarkably improved in efficiency, the input/output operations are considerably reduced, and the working accuracy is improved.

The partial program includes therein a section for receiving a tentative control output as an input, a section for calculating a correction value for performing the operation for correcting the tentative output, a section for performing the operation for correcting the tentative output by the correction value, and a section for producing the result of the corrective operation.

The partial programs are configured in such a manner that the output of one of each two partial programs having adjacent priorities is applied as an input to the other of the two partial programs having a higher priority, and that the output of the partial program corresponding to the partial specification highest in priority is finally produced as an output of the whole control program.

According to a second aspect of the invention, there is provided a control program generating apparatus characterized by comprising means for storing a plurality of control filter components corresponding to a plurality of partial specifications, respectively; priority designation means for designating the priority of each of the partial specifications; generating means for combining the control filter components corresponding to the partial specifications on the basis of the priority designated by the priority designation means to generate a plurality of control pipe components; and synthesizing means for generating the control program by synthesizing the plurality of control pipe components.

A control program generating method corresponding to the above-mentioned control program generating apparatus characterized by comprising the steps of preparing a plurality of control filter components corresponding to a plurality of partial specifications, respectively; designating the priority of each of the partial specifications; combining the control filter components corresponding to the partial specifications, respectively, on the basis of the priority designated in the priority designation step thereby to generate a plurality of control pipe components; and generating the control program by synthesizing a plurality of the control pipe components generated.

In the second aspect of the invention, the whole control program is synthesized with a plurality of control pipe components as component elements. A plurality of control pipe components having different configurations can thus be used by being switched in accordance with different devices or different operation modes. As a result, a complicated control program can be easily generated and the efficiency of development of a control program is improved.

The control pipe component has at least one control filter component therein. The control filter components are configured in such a manner that the output of that one of each two control filter components having adjacent priorities which has a lower in priority is applied to the other of the two control filter components higher in priority. The control pipe components have such a section that the output of a control filter component corresponding to a partial specification highest in priority is finally produced as an output of the whole control program.

Preferred embodiments of the present invention are described below.

(1) The generating means includes means for combining a first control component and a second control component in such a manner that the output of the first control component corresponding to the partial specification having a predetermined priority constitutes an input to the second control component corresponding to the partial specification having a designated priority higher than the predetermined priority.

The processing result based on a partial specification lower in priority is delivered at least as a part of the input to a partial program (control component) of a higher priority. A partial program corresponding to a partial specification higher in priority can thus freely change the result of processing based on a partial specification still lower in priority. A partial specification higher in priority is more accurately reflected in the contents of the final control using a simple technique of delivering the processing results between partial programs. An order of priority can thus be realized between partial specifications of the whole control program.

(2) The control filter component includes a prime control function for calculating a predetermined filtering value and a prime filter function for calculating a second control output on the basis of the first control output and the predetermined filtering value.

As a result, the filtering process is not required to be defined repetitively for each partial program, and the development of a control program is improved in efficiency.

The control filter component includes a section for inputting a tentative control output, a section for delivering data to and receiving between a corresponding partial program and a prime filter function, a section for delivering the tentative control output applied thereto and the output from the partial program as an input of the tentative control output and a threshold input to the prime filter function as a tentative control output and a threshold input, respectively, and a section for producing an output of the prime filter function based on these inputs.

(3) An apparatus further comprises means for preparing a data base for storing at least selected one of the control filter component, the control pipe component and the control program as data, condition input means for inputting a condition for retrieving the predetermined data stored in the data base, and means for retrieving the predetermined data based on the retrieving condition. A corresponding method further comprises the steps of inputting a retrieving condition for retrieving the predetermined data stored in a data base for storing at least selected one of the control filter component, the control pipe component and the control program as data, and retrieving the predetermined data based on the retrieving condition.

The control program and each data constituting the component elements thereof are stored, and are retrieved and read according to given conditions. Each data can thus be divided into components and reused.

(4) An apparatus further comprises designation means for designating the priority meeting a predetermined condition during the execution of the control program, and switch means for switching the priority according to the predetermined condition. A corresponding method further comprises the steps of designating the priority in accordance with a predetermined condition during the execution of the control program, and switching the priority according to the predetermined condition.

The priority of each partial program included in the control program may be changed by preparing a table determining the priority corresponding to predetermined conditions in an execution state of the control program and selecting the priority corresponding to the execution condition. For example, the priority of a given partial specification may be set high under a given condition, and the priority of another partial specification is set higher under another condition. In this case, the control program or each control filter component incorporates the process for switching the priority. The execution of the program or the like is monitored by an interruption or the like, and when the predetermined condition is met, the table is switched to select the predetermined order of priority. In this way, the generation of a control program can be improved in efficiency by applying the present invention to a complicated program dynamically changing in priority according to the execution condition.

As described above, according to the present invention, a control program for controlling a system is efficiently generated based on a plurality of partial programs to be included in the control program.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a schematic diagram showing a configuration of a prime control function according to the first embodiment of the invention;

FIG. 5 is a schematic diagram showing a configuration of a prime filter function according to the first embodiment of the invention;

FIG. 6 is a schematic diagram showing a configuration of a control filter component according to the first embodiment of the invention;

FIG. 7 is a schematic diagram showing a configuration of a control pipe component according to the first embodiment of the invention;

FIGS. 8A and 8B are schematic diagrams showing an example of a graphical user interface corresponding to the hierarchical structure of the control program according to the first embodiment of the invention.

FIG. 10 is a diagram showing an example of the prime control function according to the first embodiment of the invention;

FIG. 11 is a diagram showing an upper-limit filter function for limiting the upper-limit of the value according to the first embodiment of the invention;

FIG. 12 is a diagram showing a lower-limit filter function for limiting the lower-limit of the value according to the first embodiment of the invention;

FIG. 13 is a diagram showing the unique filter function with a specific value according to the first embodiment of the invention;

FIG. 20 is a schematic diagram showing a combination of component elements for the initial value of the control pipe component according to the first embodiment of the invention (fifth example);

FIG. 21 is a schematic diagram showing a structure of a control program generated according to the first embodiment of the invention;

FIG. 22 is a diagram showing an example of the control program according to the first embodiment of the invention.

DETAILED DESCRIPTION OF THE INVENTION

Figure 1:
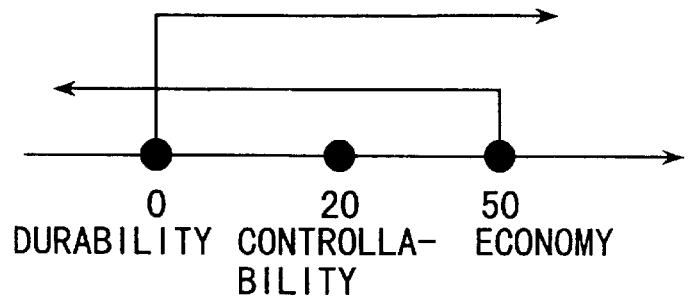
FIG. 1 is a diagram showing a numeric line indicating the relation between the output values based on each partial specification in the case where the partial specifications are not in conflict with each other in the prior art.
Figure 2:
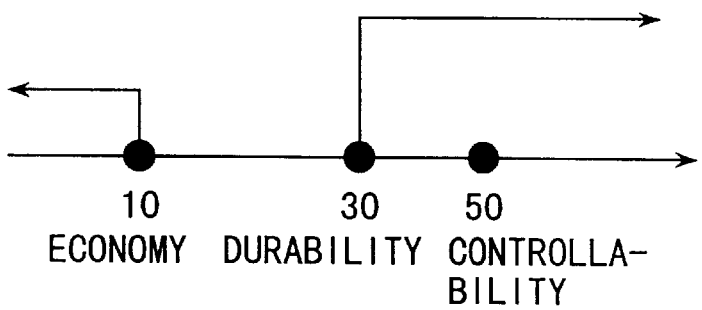
FIG. 2 is a diagram showing a numeric line indicating the relation between the output values based on each partial specification in the case where partial specifications are in conflict with each other in the prior art.

The modes of carrying out the invention (hereinafter referred to as embodiments) will be explained below with reference to the accompanying drawings.

(1) First Embodiment

[Brief description of the first embodiment]

The first embodiment will be briefly explained with reference to FIGS. 3 to 8B. In a control program generating apparatus according to the first embodiment (hereinafter referred to as this apparatus), the specification of a control program to be developed is generated as (a plurality of) partial specifications 3.

A prime control function 1 corresponding to each partial specification 3 and a priority 4 of the partial specifications 3 are determined. A prime filter function 9 is prepared for performing the filtering process for each type of the output from the prime control function 1, and the type of the filtering process is designated for each prime control function 1. A combining means 14 combines the prime filter function 9 of the designated type with each prime control function 1 and generates a control filter component 13 including the filtering function.

The prime control function 1, as shown in FIG. 4, includes a section for receiving an environment parameter (input section I1) from an external source, and a processing section F1 for calculating an output based on the partial specifications using the environment parameter received.

The prime filter function 9, as shown in FIG. 5, includes a section (input section I2) for inputting a threshold value (filtering value), a section (input section I3) for inputting a tentative control output, and a processing section F2 for performing the filtering process to calculate the value of the tentative control output subjected to corrective calculation by the threshold value. The corrective calculation means a process for defining the upper or lower limit of the tentative control output by a threshold value or a process for performing the arithmetical operation on the tentative control output by the threshold value.

A combining means generates the control filter component 13 based on the prime control function 1, the prime filter function 9 and the filter type 11. The control filter component 13, as shown in FIG. 6, includes a section (input section I4) for inputting the tentative control output, a section for delivering and receiving data to and from a corresponding partial program (prime control function 1) and the prime filter function 9, a section for delivering and receiving the tentative control output input thereto and the output from the partial programs to and from the prime filter function 9 as an input of the tentative control output and as an input of the threshold value, respectively, and a section (output section 3) for producing an output of the prime filter function based on these inputs.

A generating means 16 generates a control pipe component 15 by combining the control filter components 13 in the order for realizing the priority 4. A synthesizing means 18 generates an overall control program 17 from the control pipe components 15. The data of the prime control function 1 and the control filter component 13 are stored in a storing means 21 for reuse.

The control pipe component 15, as shown in FIG. 7, holds therein at least one control filter component 13. These control filter components 13 are configured in such a manner that the output of one of each adjacent two of the control filter components lower in priority is delivered as an input to the other control filter component. The control pipe component 15 has a section (output section 4) for producing an output of the control filter component corresponding to the partial specification of highest priority as a final output of the whole control program.

Figure 8A:
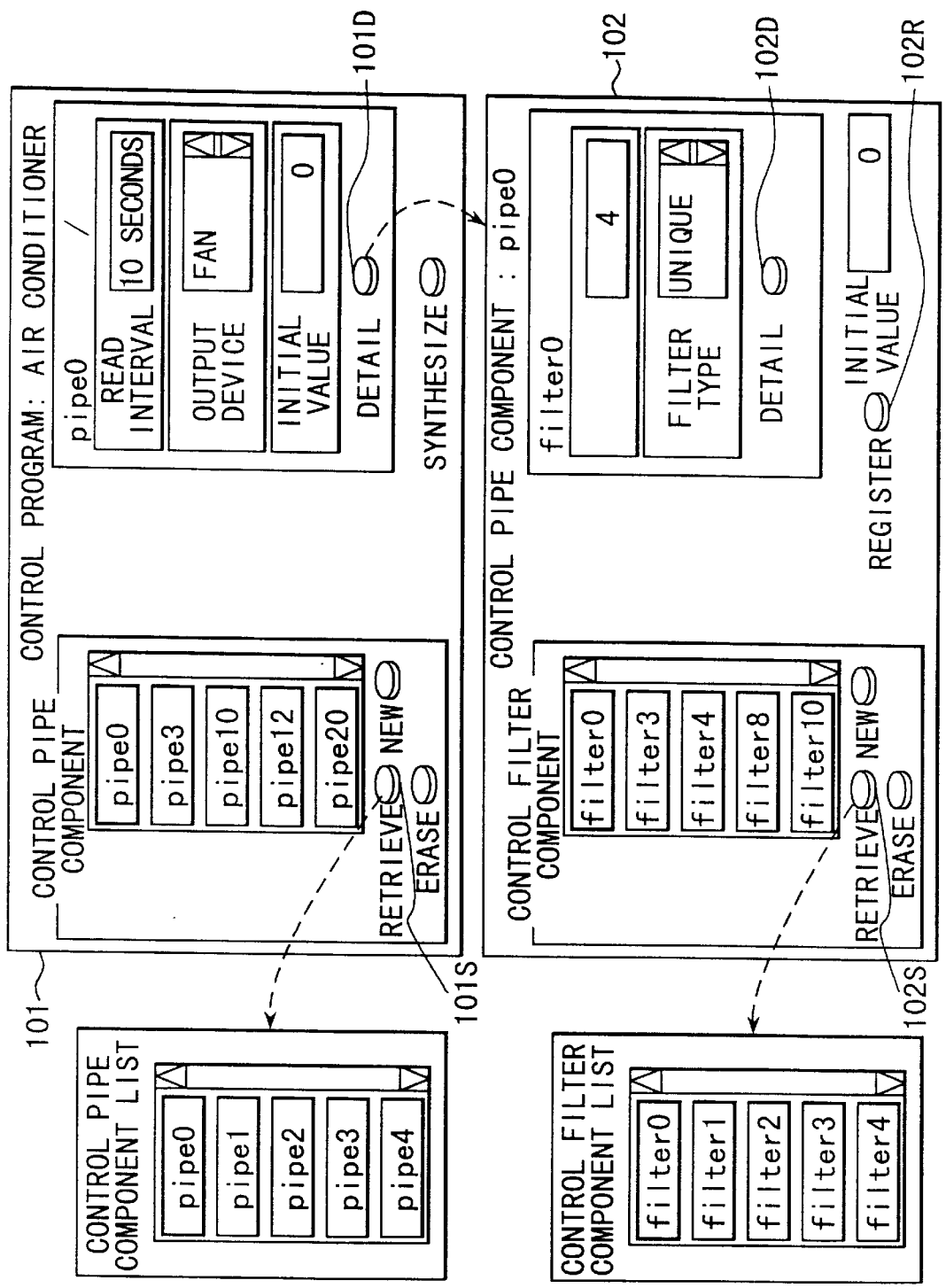

With the above configuration, a display of generating the control program of the air conditioner on a screen will be explained with reference to FIGS. 8A and 8B.

The control pipe component and the detail thereof are shown in a screen 101. One or more control pipe components are prepared for the control program, and a desired control pipe component is retrieved by a retrieve button 101S. A condition set to the selected control pipe component is shown at the right side of the screen 101. A read interval, an output device and an initial value are set to the control pipe component.

A detailed content of the control pipe component is shown in the screen 102. Each control pipe component has one or more control filter components, and contents thereof are shown in the screen 102. Each control filter component can be selected by a retrieve button. A condition set to the selected control filter component is shown at the right side of the screen 102. A detail of each control filter component is displayed by a detail button 102D as shown in screen 103. In the screen 103, information such as a filter specification and prime control function.

The prime control function, the control filter components and other components to provide component elements of a control program are called "the control components".

[Specific configuration of first embodiment]

A configuration of this apparatus will be specifically described.

Figure 3:
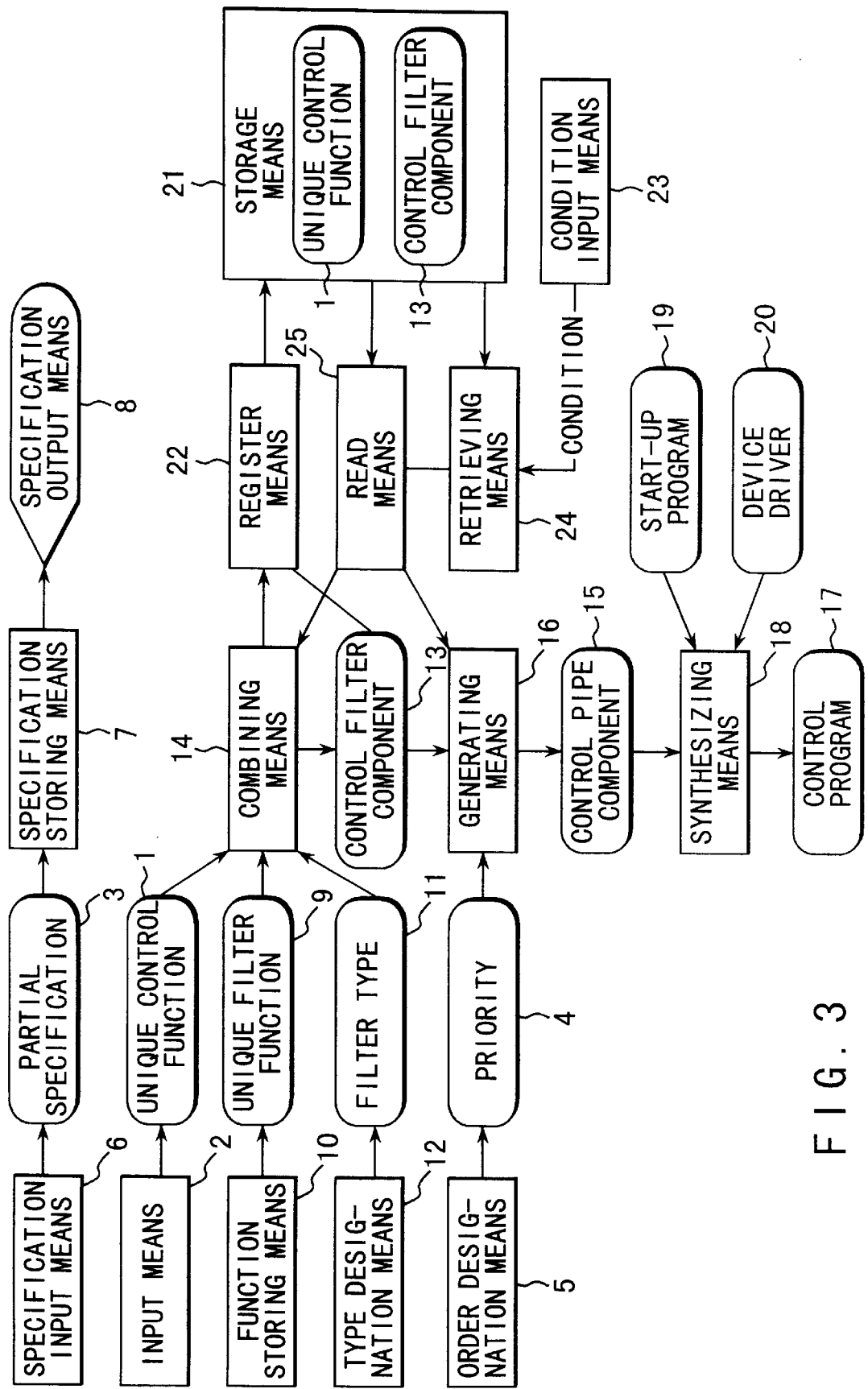
FIG. 3 is a functional block diagram showing a configuration of a control program generating apparatus according to a first embodiment of the invention.

As shown in FIG. 3, this apparatus comprises an input means 2 for inputting a prime control function 1 (corresponding to the above-mentioned partial program) corresponding to each partial specification and an order designation means 5 for designating the priority 4 between the partial specifications 3 corresponding to the prime control function 1.

This apparatus also includes a specification input means 6 for inputting each partial specification 3, a specification storing means 7 for storing each input partial specification 3, and a specification output means 8 for outputting each partial specification 3 stored in the specification storing means 7.

The partial specification 3 is a specification corresponding to each prime control function, and a content of the prime control function can be easily understood by the partial specification.

Each prime control function 1 according to the first embodiment is configured to calculate a threshold value defining the range of the values used for control. This control operation requires a filtering process for determining the range in which a value is to be included using the threshold value calculated.

This apparatus comprises a function storing means 10 for storing one or two types of a prime filter function 9 for performing the above-mentioned filtering process, a type designation means 12 for designating the filter type 11 providing the type of the prime filter function for each prime control function 1, and a combining means 14 for generating a control filter component 13 used for the control program by combining each prime control function 1 with the prime filter function 9 corresponding to the filter type 11 designated.

This apparatus also comprises a generating means 16 for generating a control pipe component 15 by combining the control filter components 13 including the prime control function 1 in such a manner as to realize the order of priority 4. The control pipe component 15 is a partial control program for generating an overall control program.

This apparatus also comprises a synthesizing means 18 for generating a control program 17 by combining a plurality of control pipe components 15. A start-up program 19 for initiating the control pipe component 15 and a device driver 20 for input/output equipment, if input as required, are incorporated in the control program 17 by the synthesizing means 18.

This apparatus also comprises a storing means 21 for storing the prime control function 1 and the control filter component 13 as data, and a register means 22 for registering each data in the storing means 21. This apparatus also comprises a condition input means 23 for inputting the condition for retrieving the data stored in the storing means 21, a retrieving means 24 for retrieving the data meeting the condition input, and a read means 25 for reading the retrieved data to be used for a new control program.

The user interface of this apparatus, including appointing device such as a mouse and a picture display unit such as a CRT, realizes an interactive graphical interface. The operator can input various data required of the apparatus such as the prime control function 1 in various forms such as a natural language, a table or a figure through the user interface. The operator also can give a necessary instruction for switching the edit mode, retrieval or generation through the user interface.

Figure 9:
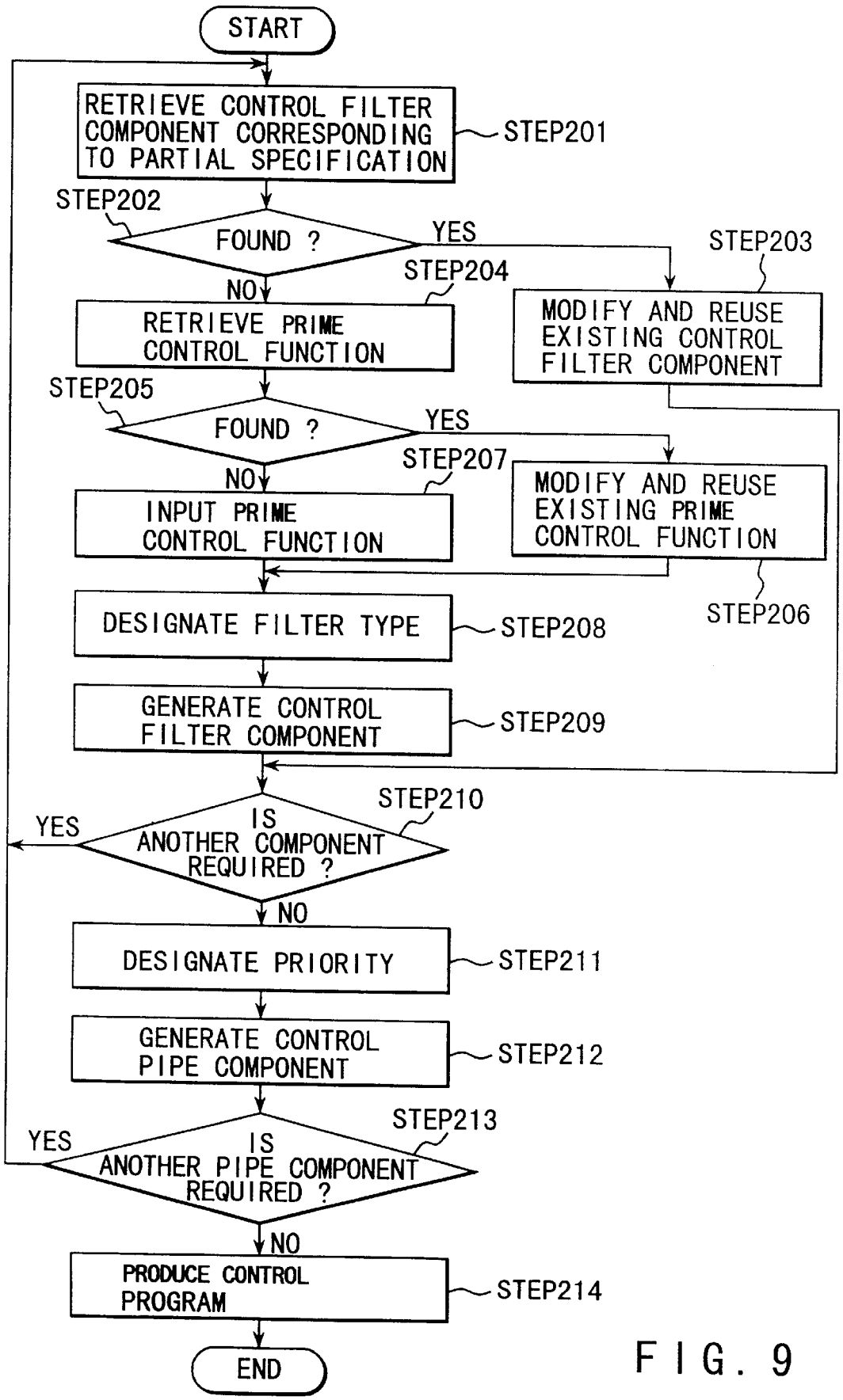
FIG. 9 is a flowchart showing the process of generating a control program according to the first embodiment of the invention.

The operation of a control program generating apparatus according to the invention configured as described above will be explained with reference to FIG. 9. FIG. 9 is a flowchart showing the process of generating a control program according to a first embodiment.

[Input of prime control function or the like]

In developing a control program 17 using this apparatus, data such as the prime control function 1 making up component elements of the control program 17 are required. The prime control function 1, which is a partial program with the contents of the partial specification 3 packaged appropriately, is supplied with data from predetermined various sensors and calculates a control value for the device to be controlled as an output value. FIG. 10 is a diagram showing an example of the prime control function 1. In FIG. 10, the functions getTs( ), getTa( ) constitute portions for accessing the input unit device driver, and the description of the "if" statement makes up the packaged portion of the output value calculation.

The data such as the prime control function 1 can be input directly, or the stored one can be reused. Specifically, according to the first embodiment, the prime control function 1 and the control filter component 13 are stored in the storing means 21. The operator inputs the desired condition by way of the condition input means 23 (condition input process), so that the retrieving means 24 retrieves the stored data meeting the condition (retrieve process in steps 201, 204), and reads them (read process). The operator can reuse the prime control function 1 and the control filter component 13 that can be reused as an element constituting a new control program 17 simply by correcting them as required (steps 203, 206).

The condition for retrieval can be freely determined and may include a specific function name, an access to a specific variable or a specific device driver, or a specific control program 17. In the case where the partial specification 3 is directly input and stored, the partial specification 3 including a specific input value name, a specific output value name, a specific condition and an output value is retrieved, and the prime control function 1 or the control filter component 13 corresponding to the partial specification obtained as a result of the retrieval can also be retrieved and read out. It is also possible to display and select the data in the descending order of the number of times reused.

As described above, according to the first embodiment, the data constituting the control program 17 or the component elements thereof are stored, and retrieved and read out in accordance with a given condition. Each data thus can be used as a component and reused.

For the data not reused, the prime control function 1 for realizing the partial specification 3 is input from the input means 2 (step 207). The prime control function 1 thus input can be registered in the storing means 21 by the register means 22 for subsequent reuse.

The partial specification 3 itself forms a foundation of the prime control function 1 and the filter type 11 and is desirably input for reference. It cannot be used, however, as a component of the control program 17 and therefore need not necessarily be input.

[Process for combining prime filter function]

According to the first embodiment, a prime filter 9 is provided for performing the filtering process on the output value of the prime control function 1. By designating the filter type 11 for each prime control function 1 using the type designation means 12 (step 208), the combining means 14 combines the prime filter function 9 of the designated type with the particular prime control function 1 thereby to produce the control filter component 13 (step 209).

Each prime filter function 9 is supplied with an output value of the prime control function 1 as an input value thereto, performs the filtering operation in accordance with the designated type, and produces an output value as a result thereof. The filter type 11 according to the first embodiment is designated from among three types including an upper-limit filter function for defining the upper limit of a value (FIG. 11), a lower-limit filter function for defining the lower limit of a value (FIG. 12), and a unique filter function for setting a value to a specific one (FIG. 13).

Assume, for example, that an input value is delivered by argument "input" and an upper-limit value by argument "param" to the upper-limit filter function of FIG. 11. In the case where the input value is larger than the upper-limit value, the output value is replaced by the contents of argument "param". In similar fashion, the lower-limit function (FIG. 12) performs the filtering operation in such a manner as to give a lower limit of the value according to the contents of the argument "param", and the prime filter function (FIG. 13) outputs any value by replacing it with a specific value providing the contents of the argument "param".

Figure 14:
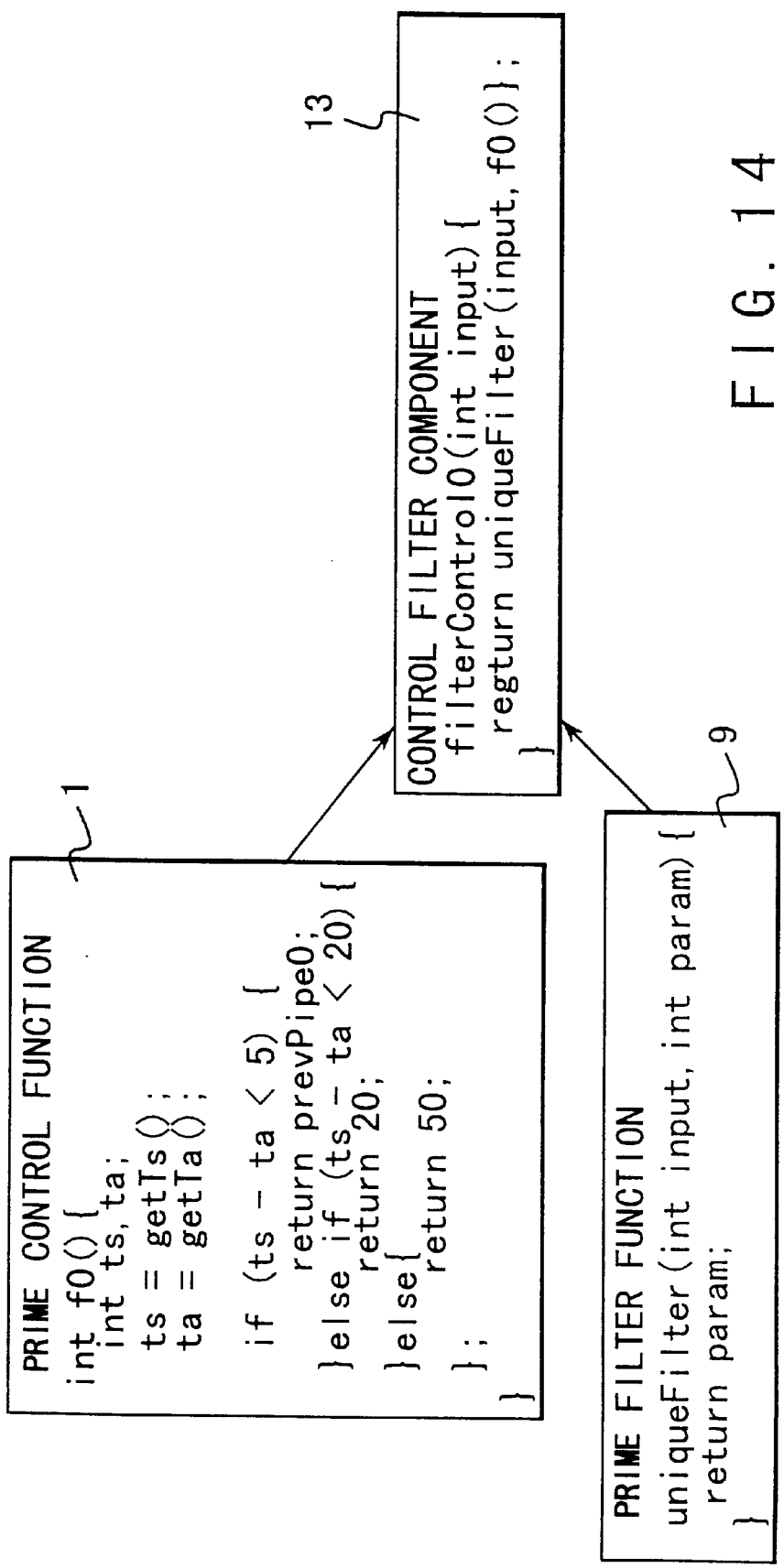
FIG. 14 is a schematic diagram showing an example in which the prime control function f0( ) is combined with the prime filter function uniqueFilter( ) to generate a control filter component filterControl10( )

FIG. 14 is a schematic diagram showing an example of generating a control filter component filterControl10( ) by combining the prime control function f0( ) and the prime filter function uniqueFilter( ). This control filter component filterControl10( ) is mainly composed of the unique filter function uniqueFilter( ), and produces a value obtained from the prime control function f0( ) in place of the value given by the argument "input".

In this way, the control filter component 13 having the prime filter 9 combined with the prime control function 1 is a function having an argument for receiving the input data, and filers and outputs the input data with the output value delivered from the internal prime control function 1 as an upper limit, a lower limit or a prime value.

Specifically, according to the first embodiment, the filtering operation using a threshold value output by the prime control function 1 can be provided in advance as a prime filtering function 9 for each type. Once the filter type 11 for filtering operation is designated for each prime control function 1, a prime filter function 9 corresponding to the designated filter type 11 is combined with each prime control function 1. As a result, repetitive definition of the filtering operation for each prime control function 1 is eliminated, thereby improving the efficiency with which the control program 17 is developed.

[Generation of control pipe components]

The process up to the generation of the control filter components is repeated until the required control filter components 13 are all prepared (step 210). In generating a control pipe component 15 from each control filter component 13 thus generated, the order of priority 4 must be set between the partial specifications 3. The partial specification 3, the prime control function 1 and the control filter component 13 correspond to each other in one-to-one relation. The order of priority 4 between the partial specifications 3, therefore, is the one between the prime control functions 1 and between the control filter components 13 at the same time. The data representing this correspondence is also held together with the priority.

The priority 4 can be given from the order designation means 5 immediately before generation of the control pipe component 15 (step 211). It can, however, be supplied at an earlier time by being input at about the same time as the prime control function 1.

The generating means 16 generates a control pipe component 15 by combining the control filter components 13 in such a manner as to be executed in the order realizing the priority 4 (step 212). The control pipe component 15, which is a type of control program, is a component element for constituting the overall control program 11.

As an example of a specific technique for combining the control filter components 13 to each other, the function names for calling each partial program are sequentially described in the high-order routine so that the partial programs are accessed in a predetermined sequence.

In an example of the order of access for realizing the order of priority 4, the data of higher priority is arranged later. In the case where an output value being processed is calculated by a control filter component 13 corresponding to a partial specification 3 low in priority, the result can be freely changed by a control filter component 13 corresponding to a partial specification 3 of higher priority. The higher the priority of a partial specification, the more accurately the particular partial specification is reflected in the final contents of control. The priority of each partial specification for the whole control program is thus realized.

Figure 15:
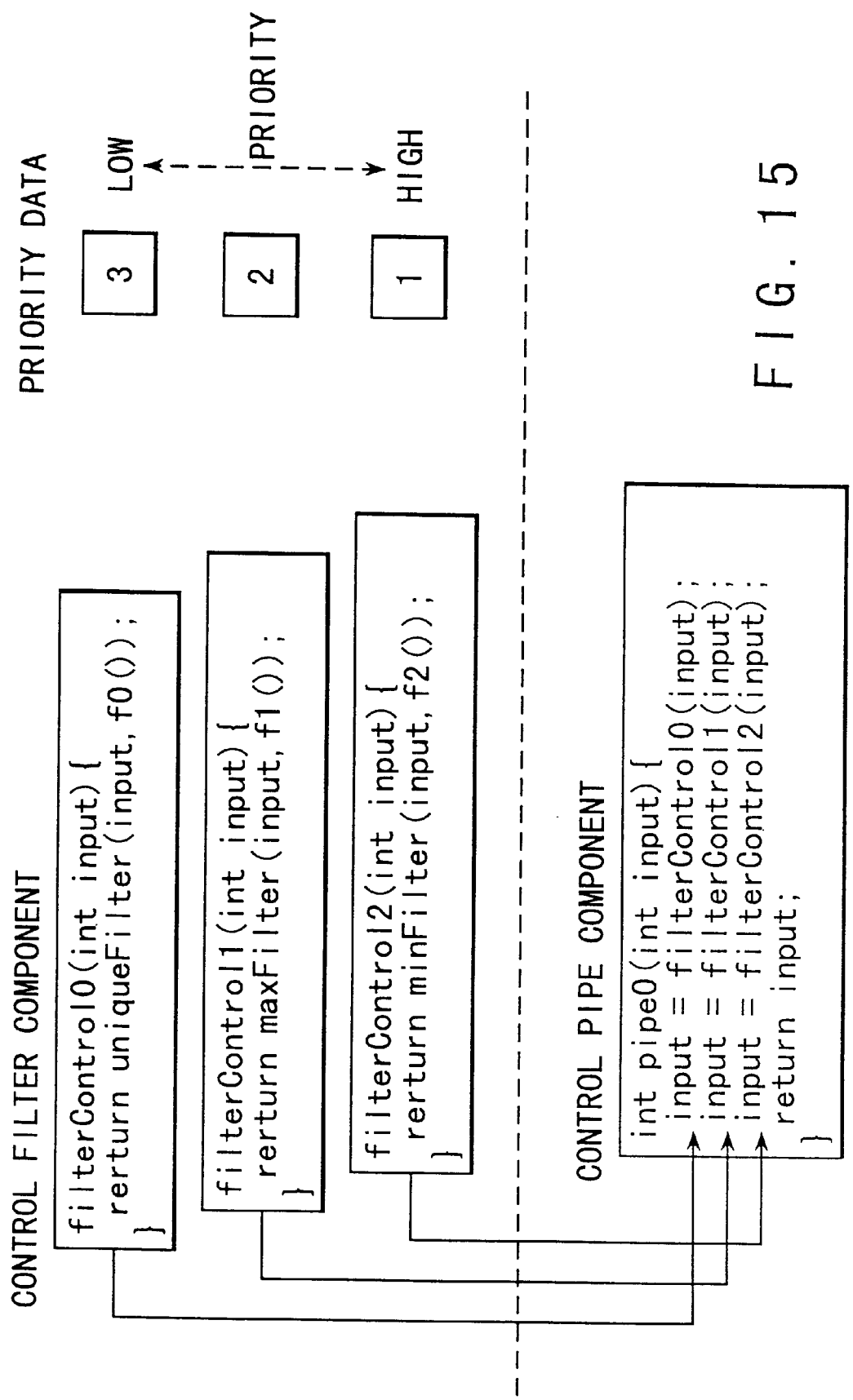
FIG. 15 is a schematic diagram showing an example in which a control pipe component is generated on the basis of the control filter component and the priority according to the first embodiment of the invention.

FIG. 15 is a schematic diagram showing an example of generating a control pipe component 15 based on the control filter component 13 and the priority 4. The control pipe component 15, as shown, accesses the control filter components 13 in the ascending order of priority 4. In the shown example, the control filter components 13 are combined in such a manner that a control filter component 13 corresponding to a partial specification of higher priority is executed in response to an input constituting the processing result of a control filter component 13 corresponding to a partial specification low in priority.

When an initial value of the data is attached to the starting point of the control pipe component 15 generated in this manner, each control filter component 13 acts sequentially on the data while retrieving the required input value and produces a final output value. The initial value attached to the control pipe component 15 is attached to that control filter component 13 of the lowest priority included in the control pipe component 15 which is accessed first of all (called the basic control filter component).

A specific constant value desirable for the control algorithm, if available, can be used as this initial value. A substitute statement for substituting a constant value into a variable is embedded in a source code, for example, so that such a constant value is given as an initial value and can be reflected in the output value from the basic control filter component.

In the absence of a constant value to be reflected in the output value from the basic control filter component, on the other hand, a control filter component including the unique filter function or a control filter component itself is used as a basic control filter component to provide an initial value.

Both the unique filter function and the prime control function output a value ignoring the numerical value from the previous starting point, and therefore can be used in the absence of the initial value at the starting point.

Figure 16:
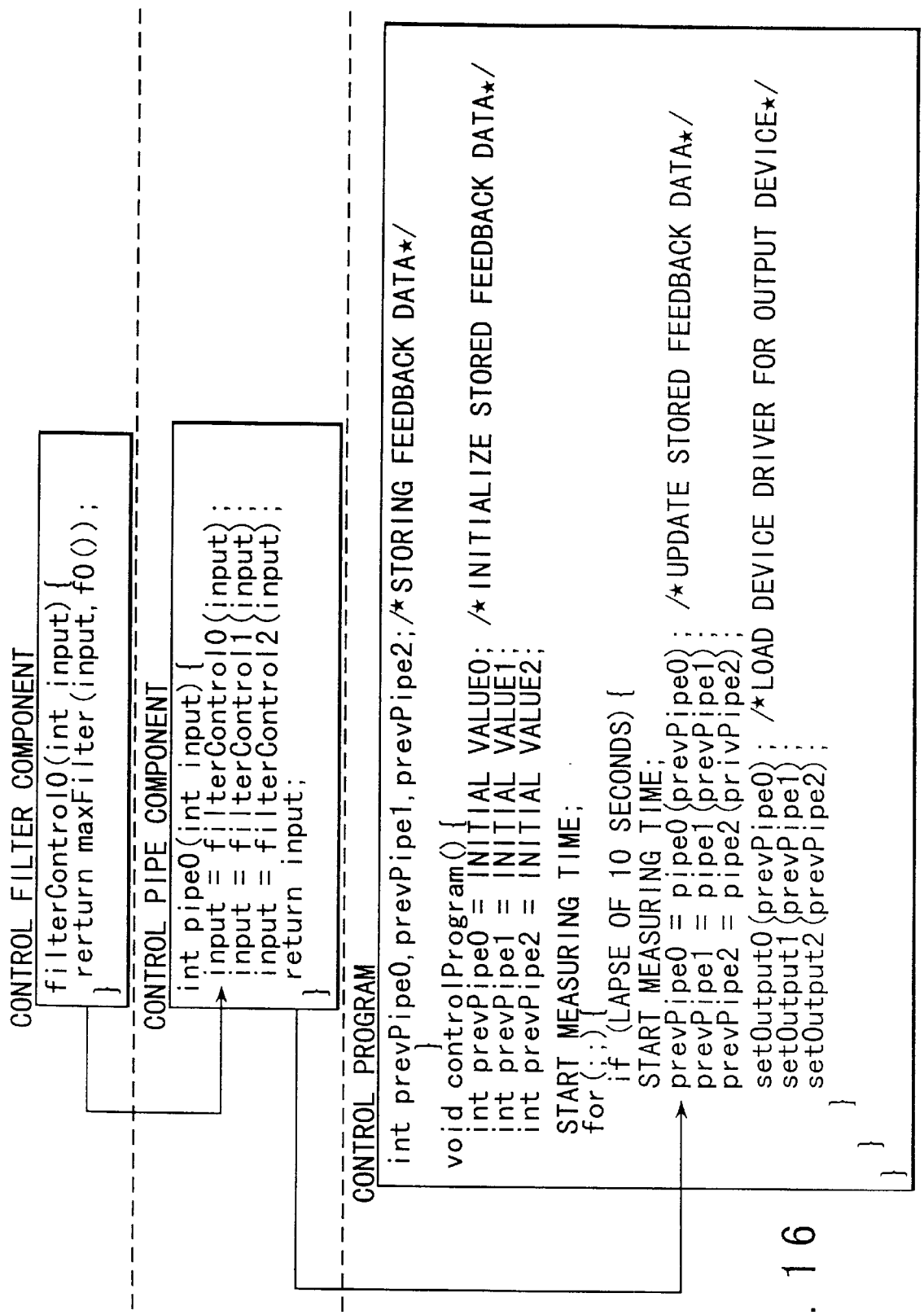
FIG. 16 is a schematic diagram showing a combination of component elements for the initial value of the control pipe component according to the first embodiment of the invention (first example)

Several combinations of the component elements for the initial value of the control pipe component 15 will be explained. In a first example, feedback data are used as an initial value each time the pipe component is executed (FIG. 16). In FIGS. 16 to 20, the dashed lines define a hierarchy of the components and the arrows indicate the combinations of the components.

In a second example, the first control filter component filterControl10( ) of the control pipe component pipe0( ) uses the unique filter component uniqueFilter( ) (FIG. 17), but not any feedback data as an initial value.

Figure 17:
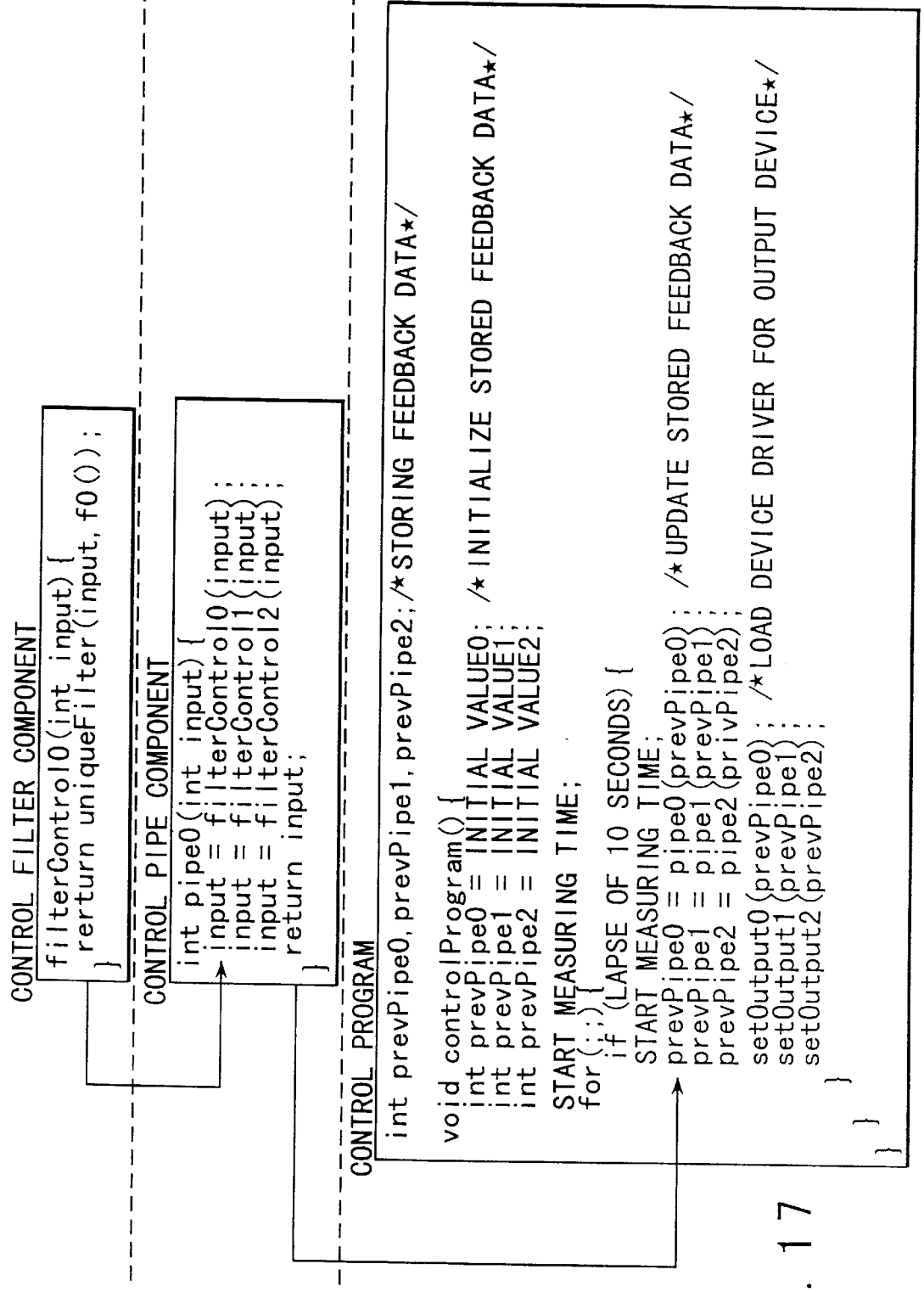
FIG. 17 is a schematic diagram showing a combination of component elements for the initial value of the control pipe component according to the first embodiment of the invention (second example)
Figure 18:
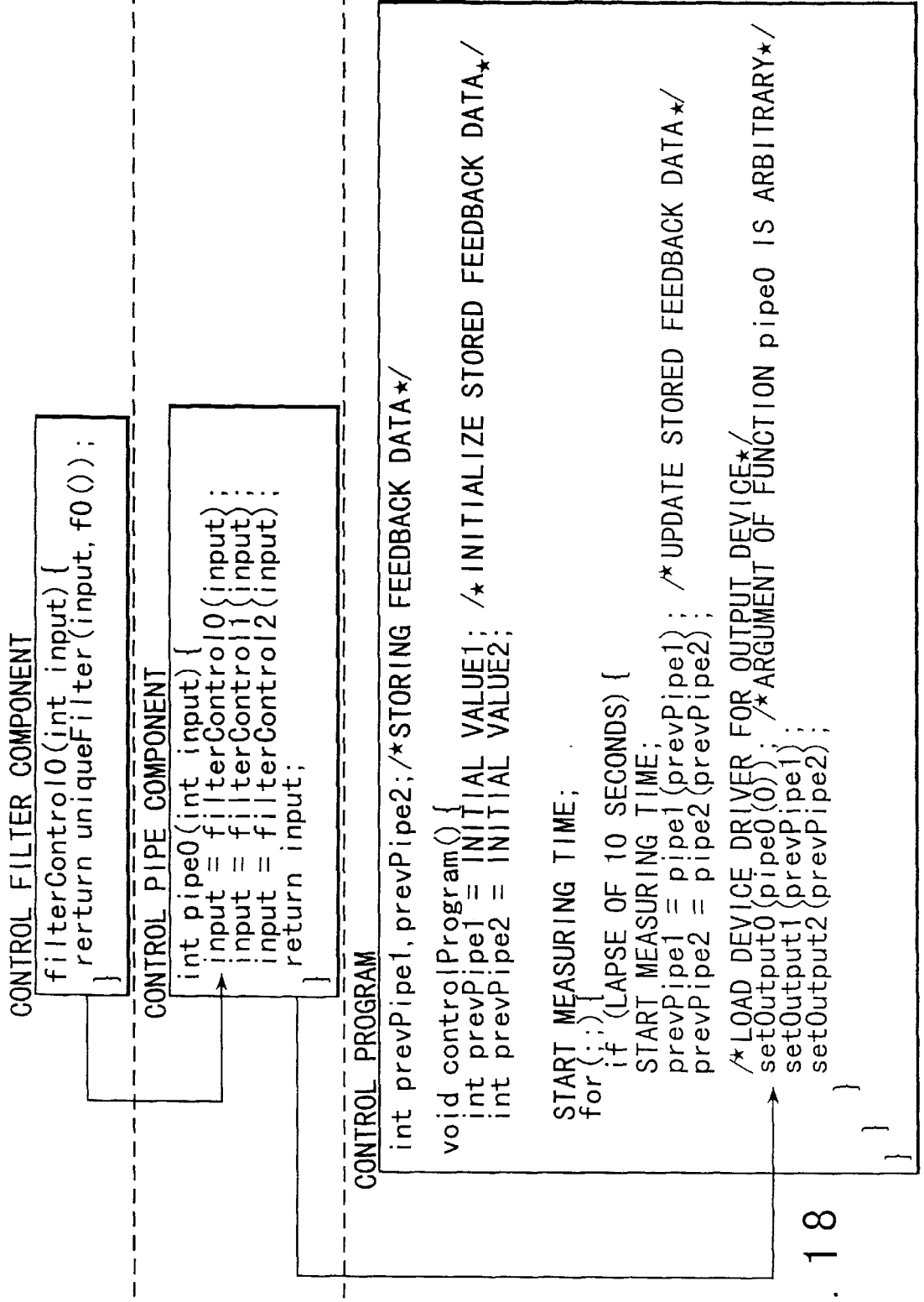
FIG. 18 is a schematic diagram showing a combination of component elements for the initial value of the control pipe component according to the first embodiment of the invention (third example)

A third example is such that the elements removable from the second example of FIG. 17 are removed and simplified (FIG. 18). In this example, therefore, the required storage area can be done without.

Figure 19:
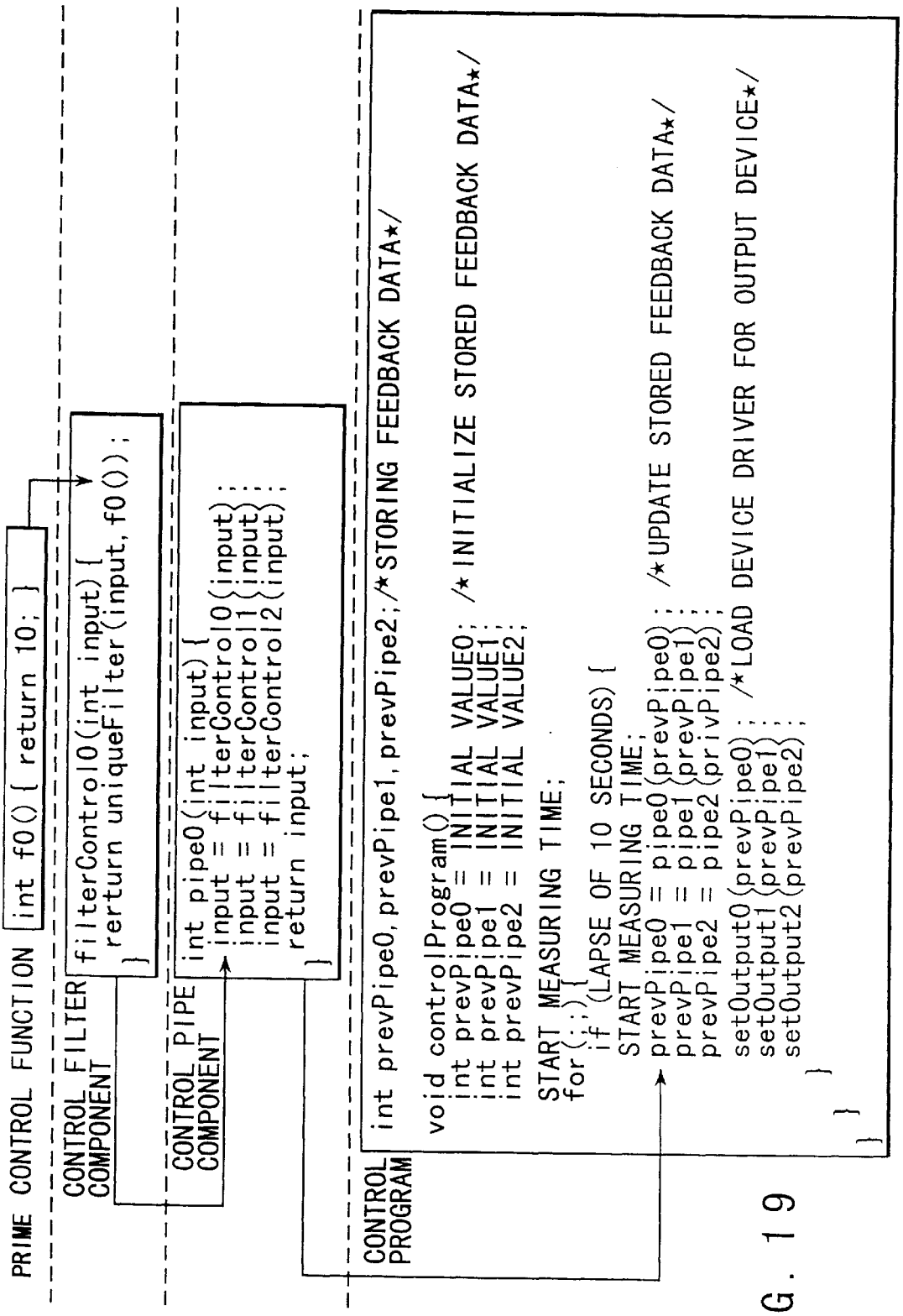
FIG. 19 is a schematic diagram showing a combination of component elements for the initial value of the control pipe component according to the first embodiment of the invention (fourth example)

In a fourth example, a condition is further added to the second example shown in FIG. 17 (FIG. 19). The initial value for each access of the pipe component is fixed, and no feedback data is used as an initial value. Specifically in this example, the first control filter component filterControl10( ) of the control pipe component pipe0( ) includes the unique filter component uniqueFilter( ) and further has a prime control function for returning a constant.

A fifth example is further simplified from the fourth example (FIG. 20), in which the absence of the variable prevPipe0 and the function filterControl10( ) can save the storage area which otherwise might be required.

As described above, according to the first embodiment, the control filter components 13 including each prime control function 1 are combined to realize an order of priority thereby to generate the control pipe component 15, finally generating the control program 17. As a result, even when the partial specifications are in conflict with each other, an order of priority is realized by executing each control filter component 13 in the control program 17.

The work for integrating the partial specifications prior to the generation of a control program is eliminated. The development of a control program is remarkably improved in efficiency, and the input/output operations are considerably reduced for an improved work accuracy.

[Process for generating control program]

The process up to the generation of a control pipe component is repeated until all the required control pipe components 15 are prepared (step 213). After that, the synthesizing means 18 generates the whole control program 17 by relating the control pipe components 15 to each other in such a manner as to be executed at a predetermined timing (step 214).

This relating process is effected by connecting the start-up program 19 with each control pipe component 15, for example. The start-up program 19 is an overriding routine for calling and starting each control pipe component 15 regularly or irregularly. Each control pipe component 15 is connected to a device driver 20 for performing input/output operations with an external device. In the control program 17 generated in this way, the control pipe components 15 are started at time intervals required by the control algorithm thereby to update the control output value.

FIG. 21 is a schematic diagram showing a structure of a control program generated by the process described above. FIG. 22 is a schematic diagram showing an example of the control program. In FIG. 21, device drivers for input and output 20A and 20B is provided to the control program, and data are input from input device A (e.g., a sensor) and are output to output device B (e.g., an air conditioner) by these device drivers.

As described above, according to the first embodiment, a control program 17 is generated with a plurality of control pipe components 15 as component elements. In the case where there exists a plurality of devices or operation modes to be controlled, therefore, a plurality of control pipe components 15 having different configurations can be used by being switched. Even a complicated control program 17 can thus be generated easily and the efficiency of developing a control program is improved. The condition for synthesizing specification in the order of priority is that when partial specifications are arranged in the ascending order of priority, an output value satisfying all the i-th and subsequent partial specification constitutes an output value of the synthesized specification, where i is the minimum value enabling the output value satisfying all the i-th and subsequent partial specifications to be selected.

As a method of description corresponding to each partial specification, "the filter synthesized specification format" is introduced and interpreted. Using this filter synthesized specification format, let us prove that the control program according to this invention satisfies "the condition for synthesized specification based on strict order of priority".

[Filter synthesized specification format]

The filter synthesized specification format includes two types of specification including the filter specification and the priority specification. The filter specification is called an upper-limit specification, a lower-limit specification or a unique filter specification depending on whether the specification defines an upper limit, a lower limit or designates a unique output. Each filter specification includes a specification for calculating the value of the upper limit, the lower limit or the unique output. This value is called the threshold of the filter specification. The priority specification describes an order of priority between the filter specifications. The filter synthesized specification format having the right filter specification and the right priority specification are defined as follows.

[Interpretation of filter synthesized specification format]

The filter synthesized specification format is interpreted as described below. First, the filter specification is interpreted as a function F for converting a tentative output value X into a new output value X'. The function F is defined below, where f is a function for calculating the threshold value of the filter specification, and the argument e of the function f indicates an arrangement of all the parameters required for calculating a control value.

Upper-limit filter specification:

$$F(X,e) \equiv min(X,f(e))$$

Lower-limit filter specification:

$$F(X,e) \equiv max(X,f(e))$$

Unique filter specification:

$$F(X,e) \equiv f(e)$$

where the filter synthesized specification format including n filter specifications is interpreted to produce an output value $X_n$ defined by a recurrence formula as shown below. A function corresponding to the filter specification having the i-th priority is called $F_i$, and a function giving a threshold value of the filter specification is called $f_i$.

1. $X_1 = f_1(e)$
2. $X_n = F_n(X_{n-1}, e)$

[Legitimacy of filter synthesized specification format]

In order to show the legitimacy of this filter synthesized specification format, let us prove by induction that this specification format is a synthesized specification based on a strict order of priority.

First, when there involves only one filter specification, the result is clear. On the other hand, assume that there are (n−1) filter specifications.

The lemma in this case is that the filter synthesized specification format including n filter specifications constitutes a synthesized specification based on a strict order of priority when the filter synthesized specification format including (n−1) filter specifications except for the filter specification of highest priority are based on the strict order of priority.

This can be proved as follows. The output of the filter synthesized specification format having (n−1) filter specifications is assumed to be $X_{n-1}$, and that having n filter specifications to be $X_n$. The function giving the threshold value of the n-th filter specification is assumed to be $f_n(e)$.

In this case, assume by induction that when the partial specifications are arranged in the ascending order of priority, all the $(i_{n-1})$th and subsequent partial specifications are met by $X_{n-1}$ with respect to the minimum $i_{n-1}$ associated with an output value satisfying all the $(i_{n-1})$th and subsequent partial specifications.

First, when the n-th partial specification is the upper-limit filter specification, $$Xn = min(Xn-1, f(e))$$

Thus, $$X_n = X_{n-1}: \text{ where } X_{n-1} \leq f_1(e)$$

The assumption by induction clearly shows that when the partial specifications are arranged in the ascending order of priority, the minimum i associated with an output value satisfying all the i-th and subsequent partial specifications is $i_{n-1}$ and that $X_n$ satisfies all the i-th and subsequent partial specifications.

When $$X_n = f_1(e): \text{ where } X_{n-1} > f_1(e)$$

Let us prove that $X_n$ "is an output satisfying all the i-th and subsequent partial specifications for the minimum i associated with an output value satisfying all the i-th and subsequent partial specifications arranged in the ascending order of priority".

Assume that the j-th partial specification is the minimum one not satisfied by $X_n$. In order to prove this, it is sufficient to show that "no $X'_n$ smaller than $X_n$ satisfies all the j-th and subsequent partial specifications".

Specifically, when the j-th partial specification is a lower-limit specification, $f_j \geq X_n$, where $f_j$ is the threshold value, and therefore $X'_n$ is in conflict with this partial specification. The $X'_n$ under consideration, therefore, does not exist.

When the j-th partial specification is an upper-limit specification, on the other hand, it is necessary that $X'_n \leq f_j < X_n$ if $X'_n$ is to satisfy this partial specification, where $f_j$ is the threshold value. It is assumed $X_n > X_{n-1}$ by induction, however. In the case where such an upper-limit specification exists, therefore, there needs an upper-limit specification in which a threshold value $f_i'(j < i' < n-1)$ exists between the j-th partial specification and the (n−1)th partial specification. Such a partial specification, however, is in conflict with $X_{n-1}$. Thus, there exists no $X'_n$ mentioned above.

When the j-th partial specification is a unique specification, it is necessary that $X'_n = f_j < X_n$ if $X'_n$ is to satisfy this partial specification. It is assumed that $X_n > X_{n-1}$ by induction. In the case where such an upper-limit specification exists, therefore, there needs an upper-limit specification in which the threshold value $f_i'(j<i'<n-1)$ exists between the j-th partial specification and the (n−1)th partial specification. Such a partial specification, however, is in conflict with $X_{n-1}$. Therefore, there exists no such $X'_n$ that is described above.

In the case where the n-th partial specification is a lower-limit filter specification, the result is apparent from the symmetry with respect to the upper-limit filter. The same holds true in the case where the n-th partial specification is a unique filter specification.

The above-mentioned fact proves that the filter synthesized specification format comprised of arbitrary n filters is a synthesized specification based on a strict order of priority.

As described above, according to the first embodiment, the work of integrating the partial specifications 3 is not required before generating the control program 17. The development of a control program thus is remarkably improved in efficiency, and the input/output operations are considerably reduced, resulting in an improved working accuracy.

More specifically, the work of generating a control program is remarkably automated, and therefore, the number of steps requiring manual work is reduced, thereby reducing the likelihood of an error. An increase in the number of partial specifications or the types of the output value due to the partial specifications does not considerably increase the work contents. The problem of a vast amount of work required for input and output is thus obviated.

Further, since the component elements of the control program are used as components in the form of data such as the control filter components 13, the reuse is facilitated. Even in the case where the contents of the partial specification 3 or the priority 4 of the partial specifications is changed, the component elements in the form of components can be used directly. The whole work, therefore, need not be restarted.

The work of packaging the partial specifications 3 as a program can be easily accomplished by combining the prime control function 1 providing a partial program. Even when the contents of the partial specification 3 or the priority 4 between the partial specifications 3 is changed, the whole programming work is not required to be restarted.

(2) Second Embodiment

Figure 23:
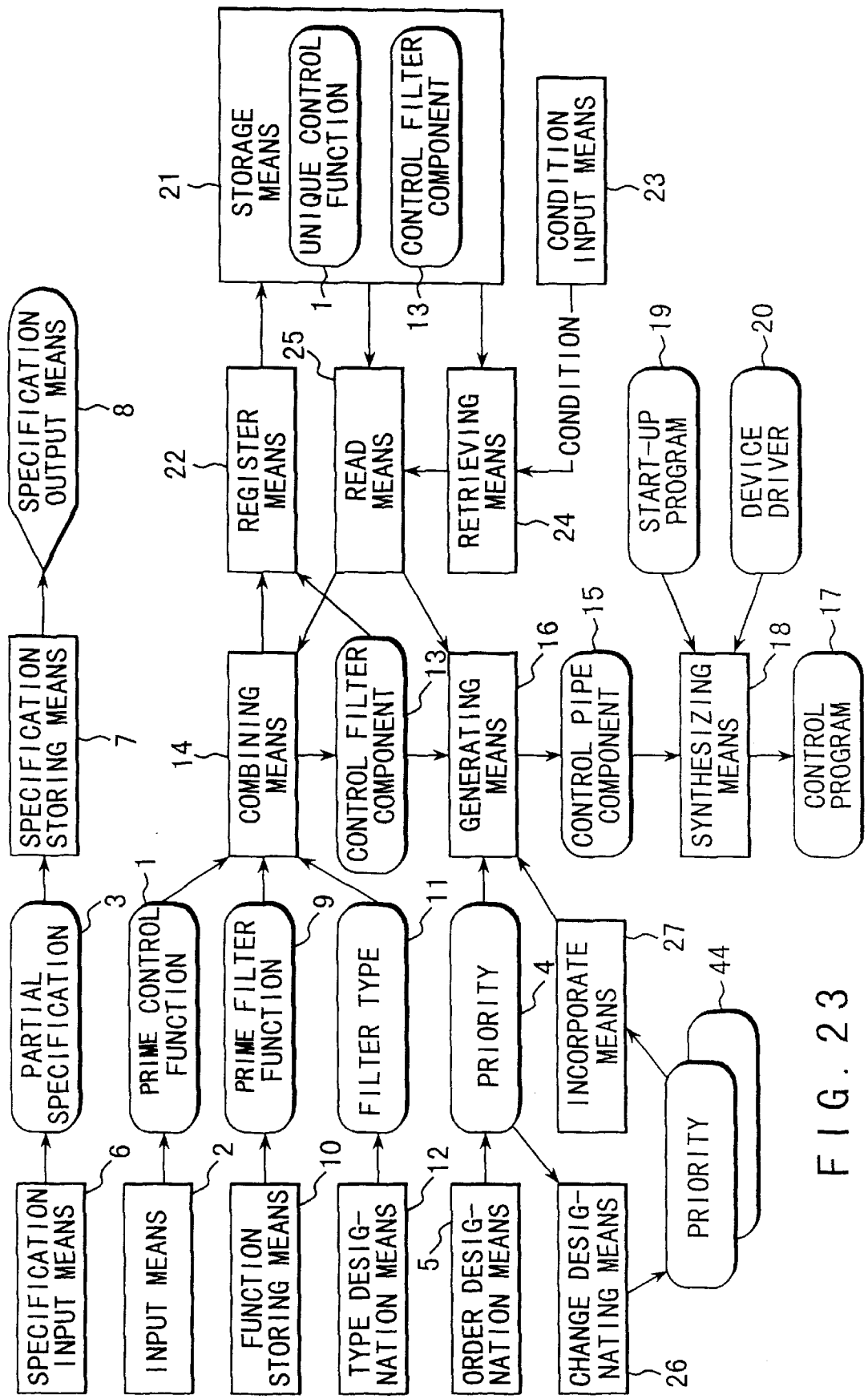
FIG. 23 is a functional block diagram showing a configuration of a control program generating apparatus according to a second embodiment of the invention.

FIG. 23 is a function block diagram showing a configuration of a control program generating apparatus according to the second embodiment. A change designation means 26 designates in advance the contents of dynamic change of the priority meeting a predetermined condition during the execution of a control program (change designation process). The priority of a given partial specification is advanced under some condition, for example, while the priority of another partial specification is advanced under another condition. For example, one or more tables corresponding to or including two or more priorities 44 are prepared in accordance with the condition.

The process of switching the priority is incorporated by an incorporating means 27 into the control program (incorporating process). The execution is monitored by an interruption process or the like. When the predetermined condition is met, a desired priority is selected from the tables. For example, the priorities 44 are assumed to be a plurality of tables that can be switched (selected) according to the condition, and the order of execution of the control filter components is determined with reference to the table from the control pipe components 15 at the time of actual execution.

In this way, an application of the invention to a complicated control program having a dynamically changing priority can improve the efficiency of control program generation.

(3) Other Embodiments

This invention is not limited to the above-mentioned embodiments, but can be modified freely, and therefore also is applicable to other embodiments described below. The "function" or "component" referred to in this specification, for example, is defined as software elements in the wide sense of the word functioning as a predetermined program, but is not limited to a function in the narrow sense of the word in the program language processing system.

The combination between the partial programs or between the control filter components based on the order of priority is not limited to the access by the function name but can be carried out in other modes with equal effect. In the case where a language processing system is used in which the order of execution is determined by the row number of the source code, for example, the use of the priority expressed by an integer as a row number can execute the partial programs or control filter components in ascending order of priority.

The type of the filtering operation realized by the prime filter function is not limited to those shown in the above-mentioned embodiments, but a value can be limited to a predetermined numerical range or a specific numerical value can be avoided freely. The filtering process does not necessarily use the prime filter function but can be realized also by direct description in the partial program.

The manner of relating the control pipe components to each other for executing them at predetermined timings is not limited to sequentially accessing them by the function name, but can be freely determined by employing a timer interruption or the like. The control pipe component is not necessarily generated from the control filter components, but the partial programs with a description containing the filtering operation can be combined or the control filter components can be combined with the partial programs.

The control pipe component is not necessarily generated from the partial programs or the control filter components. In the case where a single device is controlled, for example, a control program making up a final completed product can be directly generated.

The partial programs may be combined in a manner to realize an order of priority to be executed in the ascending order of priority. For example, the prime control functions can be executed in a random order regardless of the priority and the output values are stored. After complete execution of all the prime control functions, the output values are combined based on the priority thereby to realize an order of priority.

The data intended to be stored in the storing means for reuse may be selected one or a plurality of selected ones of the partial program, the control filter component, the control pipe component and the control program. The partial specification can also be directly used or the desired other data can be stored and reused.

The contents of the condition used for dynamic change in priority can be freely determined as the contents of the input condition, time or the operation mode. The contents of the change and the number of types thereof can also be freely determined.

An apparatus and a method of generating a control program can be realized with a computer software. A medium having such a software recorded therein also constitutes a mode of carrying out the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A control program generating apparatus for generating a control program, comprising:
storing means for storing a plurality of control filter components each of which corresponds to one of a plurality of partial specifications, wherein an entire specification is constructed by said plurality of partial specifications;
priority designation means for designating the priority of each of said plurality of partial specifications; and
generating means for combining the plurality of control filter components corresponding to said plurality of partial specifications on the basis of the priority designated by said priority designation means.

2. A control program generating apparatus according to claim 1, wherein said generating means includes means for combining a first control component and a second control component in such a manner that an output of said first control component corresponding to the partial specification having a predetermined priority constitutes an input to said second control component corresponding to the partial specification, said second control component having a designated priority higher than said predetermined priority of said first control component.

3. A control program generating apparatus according to claim 1, wherein said control filter component includes a prime control function for calculating a predetermined filtering value and a prime filter function for calculating a second control output on the basis of said first control output and said predetermined filtering value.

4. A control program generating apparatus according to claim 1, further comprising combining means for generating said control filter component by combining the prime control function for calculating a predetermined filtering value with the prime filter function for calculating a second control output based on a first control output and said predetermined filtering value.

5. A control program generating apparatus according to claim 1, further comprising means for preparing a data base for storing at least selected one of said control filter component, said control pipe component and said control program as data, condition input means for inputting a condition for retrieving said predetermined data stored in said data base, and means for retrieving said predetermined data based on said retrieving condition.

6. A control program generating apparatus according to claim 1, further comprising designation means for designating the priority meeting a predetermined condition during the execution of said control program, and switch means for switching said priority according to said predetermined condition.

7. A control program generating apparatus for generating a control program, comprising:
storing means for storing a plurality of control filter components each of which corresponds to one of a plurality of partial specifications, wherein an entire specification is constructed by said plurality of partial specifications;
priority designation means for designating the priority of each of said plurality of partial specifications;
generating means for combining the plurality of control filter components corresponding to the partial specifications on the basis of the priority designated by said priority designation means to generate a plurality of control pipe components; and
synthesizing means for generating said control program by synthesizing said plurality of control pipe components.

8. A control program generating apparatus according to claim 7, wherein said generating means includes means for combining a first control component and a second control component in such a manner that an output of said first control component corresponding to the partial specification having a predetermined priority constitutes an input to said second control component corresponding to the partial specification, said second control component having a designated priority higher than said predetermined priority of said first control component.

9. A control program generating apparatus according to claim 7, wherein said control filter component includes a prime control function for calculating a predetermined filtering value and a prime filter function for calculating a second control output on the basis of said first control output and said predetermined filtering value.

10. A control program generating apparatus according to claim 7, further comprising combining means for generating said control filter component by combining the prime control function for calculating a predetermined filtering value with the prime filter function for calculating a second control output based on a first control output and said predetermined filtering value.

11. A control program generating apparatus according to claim 7, further comprising means for preparing a data base for storing at least selected one of said control filter component, said control pipe component and said control program as data, condition input means for inputting a condition for retrieving said predetermined data stored in said data base, and means for retrieving said predetermined data based on said retrieving condition.

12. A control program generating apparatus according to claim 7, further comprising designation means for designating the priority meeting a predetermined condition during the execution of said control program, and switch means for switching said priority according to said predetermined condition.

13. A control program generating method for generating a control program, comprising the steps of:
preparing a plurality of control filter components each of which corresponds to one of a plurality of partial specifications, wherein an entire specification is constructed by said plurality of partial specifications;
designating the priority of each of said plurality of partial specifications; and
combining the plurality of control filter components corresponding to said plurality of partial specifications, respectively, on the basis of the priority designated in said priority designation step.

14. A control program generating method according to claim 13, wherein said control filter component includes a prime control function for calculating a predetermined filtering value, and a prime filter function for calculating a second control output based on a first control output and said predetermined filtering value.

15. A control program generating method according to claims 13, further comprising the step of generating said control filter component by combining a prime control function for calculating a predetermined filtering value with a prime filter function for calculating a second control output on the basis of a first control output and said predetermined filtering value.

16. A control program generating method according to claim 13, further comprising the steps of inputting a retrieving condition for retrieving said predetermined data stored in a data base for storing at least selected one of said control filter component, said control pipe component and said control program as data, and retrieving said predetermined data based on said retrieving condition.

17. A control program generating method according to claim 13, further comprising the steps of designating said priority in accordance with a predetermined condition during the execution of said control program, and switching said priority according to said predetermined condition.

18. A control program generating method for generating a control program, comprising the steps of:
   preparing a plurality of control filter components each of which corresponds to one of a plurality of partial specifications, wherein an entire specification is constructed by said plurality of partial specifications;
   designating the priority of each of said plurality of partial specifications;
   combining the control filter components corresponding to said plurality of partial specifications, respectively, on the basis of the priority designated in said priority designation step thereby to generate a plurality of control pipe components; and
   generating said control program by synthesizing a plurality of said control pipe components generated.

19. A control program generating method according to claim 18, wherein said control filter component includes a prime control function for calculating a predetermined filtering value, and a prime filter function for calculating a second control output based on a first control output and said predetermined filtering value.

20. A control program generating method according to claims 18, further comprising the step of generating said control filter component by combining a prime control function for calculating a predetermined filtering value with a prime filter function for calculating a second control output on the basis of a first control output and said predetermined filtering value.

21. A control program generating method according to claim 18, further comprising the steps of inputting a retrieving condition for retrieving said predetermined data stored in a data base for storing at least selected one of said control filter component, said control pipe component and said control program as data, and retrieving said predetermined data based on said retrieving condition.

22. A control program generating method according to claim 18, further comprising the steps of designating said priority in accordance with a predetermined condition during the execution of said control program, and switching said priority according to said predetermined condition.

23. A readable code recorded on a recording medium for generating a control program, said code comprising:
   a code for executing a priority designation process for designating the priority of each of a plurality of partial specifications using control filter components each corresponding to one of said partial specifications, in which an entire specification is constructed by said plurality of partial specifications; and
   a code for executing the process of generating by combining a control filter component corresponding to each of said plurality of partial specifications on the basis of the priority designated by said priority designation process.

24. The readable code according to claim 23, further comprising a code for executing a storing process for storing a plurality of said control filter components.

25. A control program generating apparatus for generating a control program, comprising:
   means for storing a plurality of control filter components each of which corresponds to one of a plurality of partial specifications, wherein an entire specification is constructed by said plurality of partial specifications;
   priority designation means for designating the priority of each of said plurality of control filter components; and
   generating means for combining said plurality of control filter components on the basis of priority designated by said priority designation means.

* * * * *